(12) United States Patent
Nagayama

(10) Patent No.: US 8,144,116 B2
(45) Date of Patent: Mar. 27, 2012

(54) ELECTROPHORETIC DISPLAY APPARATUS AND DRIVING METHOD THEREOF

(75) Inventor: Kohei Nagayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 677 days.

(21) Appl. No.: 10/552,989

(22) PCT Filed: Jun. 8, 2005

(86) PCT No.: PCT/JP2005/010895
§ 371 (c)(1),
(2), (4) Date: Feb. 5, 2007

(87) PCT Pub. No.: WO2005/121886
PCT Pub. Date: Dec. 22, 2005

(65) Prior Publication Data
US 2007/0120812 A1    May 31, 2007

(30) Foreign Application Priority Data
Jun. 8, 2004    (JP) .................. 2004-170510

(51) Int. Cl.
*G02F 1/167* (2006.01)
*G09G 3/34* (2006.01)

(52) U.S. Cl. ............... 345/107; 359/228; 359/296

(58) Field of Classification Search ........... 345/84, 345/107; 359/228, 296
See application file for complete search history.

(56) References Cited

U.S. PATENT DOCUMENTS

| 5,411,833 A * | 5/1995 | Swidler .................. 430/108.3 |
| 5,962,581 A * | 10/1999 | Hayase et al. ............. 524/588 |
| 6,239,896 B1 * | 5/2001 | Ikeda ......................... 359/240 |
| 6,700,558 B1 * | 3/2004 | Itoh ............................. 345/87 |
| 6,724,519 B1 * | 4/2004 | Comiskey et al. ......... 359/296 |
| 6,727,883 B2 * | 4/2004 | Uno et al. .................. 345/107 |
| 6,741,385 B2 * | 5/2004 | Ikeda et al. ................ 359/296 |
| 6,861,497 B2 * | 3/2005 | Lindsay et al. ............. 528/353 |
| 7,733,323 B2 * | 6/2010 | Togano et al. .............. 345/107 |
| 2004/0058079 A1 * | 3/2004 | Yamada et al. ............. 427/387 |
| 2004/0070557 A1 * | 4/2004 | Asano et al. ................. 345/76 |
| 2004/0184136 A1 * | 9/2004 | Goden ....................... 359/296 |
| 2005/0104844 A1 * | 5/2005 | Nakai et al. ................ 345/107 |

FOREIGN PATENT DOCUMENTS

| GB | 1 507 832 | | 4/1978 |
| JP | 3421494 | | 4/2003 |
| WO | WO 02/073304 | | 9/2002 |
| WO | WO 2004/095122 | * | 4/2004 |
| WO | WO 2004/044647 | * | 5/2004 |

* cited by examiner

*Primary Examiner* — Amr Awad
*Assistant Examiner* — Stephen Bray
(74) *Attorney, Agent, or Firm* — Fitzpatrick, Cella, Harper & Scinto

(57) ABSTRACT

An electrophoretic display device includes a substrate, a partition wall disposed on a surface of the substrate, and a liquid layer, disposed in a container defined by the substrate and the partition wall, including electrophoretic particles and a dispersion medium. In addition, a first electrode is formed at a position apart from the partition wall on the substrate, a second electrode is formed along the partition wall, and a voltage applicator applies a voltage between the first electrode and the second electrode. At the surface of the substrate defining the container, a resistance layer electrically connecting the first electrode and the second electrode is formed, and the electrophoretic particles in the container are moved between a surface of the partition wall and a surface of the resistance layer to effect display.

11 Claims, 18 Drawing Sheets

(a)

(b)

(c)

ELECTROPHORETIC DISPLAY APPARATUS AND DRIVING METHOD THEREOF

TECHNICAL FIELD

The present invention relates to an electrophoretic display apparatus and a driving method thereof.

BACKGROUND ART

With development of information equipment, the needs for low-power and thin display apparatuses having grown, so that extensive study and development have been made on display apparatuses fitted to these needs.

Such a display apparatus is used frequently outdoors particularly as a wearable PC (personal computer) or an electronic note pad, thus being desirable that it can save power consumption and space. For this reason, e.g., such a product that a display function of a thin display such as a liquid crystal display and means for inputting coordinate data are integrated, and direct input can be effected by pressing a display item on a display surface with a stylus or finger, has been commercialized.

However, most of liquid crystal materials have no memory characteristic, so that it is necessary to continuously apply a voltage to the liquid crystal during a display period. On the other hand, a liquid crystal material having a memory function cannot readily ensure a reliability in the case of assuming its use in various environments such as outdoor environment as in the wearable PC, thus failing to be put into practical use.

In view of these circumstances, as one of thin and light display apparatuses, an electrophoretic display apparatus has been proposed (e.g., Japanese Patent Publication No. 3421494).

This type of electrophoretic display apparatus includes a pair of substrates disposed with a predetermined spacing therebetween, an insulating liquid filled in the spacing, a multiplicity of charged electrophoretic (migration) particles dispersed in the insulating liquid, a pair of electrodes disposed close to the insulating liquid, and an insulating layer disposed to cover the electrodes.

FIGS. 16(a) and 16(b) show an embodiment of a structure of such a conventional electrophoretic display device, wherein various types of display are effected by utilizing a difference in color between the case of distributing a large amount of electrophoretic particles 104 disposed in an insulating liquid 103 in a side area as shown in FIG. 16(a) and the case of collecting the electrophoretic particles 104 in a narrow area as shown in FIG. 16(b). As shown in FIGS. 16(a) and 16(b), the electrophoretic display device includes a pair of substrates 101 and 102, the insulating liquid 103, the electrophoretic particles 104, a pixel electrode 105, a common electrode 106 disposed to partition pixels, and insulating films 107 and 108 which cover the electrodes 105 and 106, respectively.

According to the inventor's analysis, in the electrophoretic display device shown in FIGS. 16(a) and 16(b), an equipotential line is indicated by dotted lines as shown in FIG. 17 when a voltage is applied between the pixel electrode 105 and the common electrode 106. As apparent from this figure, the equipotential line is dense at a pixel peripheral portion where a distance between the electrodes 105 and 106 is small, so that an electric field is strong. At a central portion of pixel G, an electric field is weak. In other words, it is found that an electric field (distribution) in a liquid layer comprising the insulating liquid 103 and the electrophoretic particles 104 is nonuniform. In such a vertical movement type electrophoretic display device that electrophoretic particles are moved between electrodes disposed on upper and lower substrates, such a nonuniform electric field is not caused to occur but in the case of a horizontal movement type electrophoretic display device as shown in FIGS. 16(a) and 16(b), the electrophoretic particles are generally moved between an electrode in pixel and an electrode at a pixel peripheral portion, so that a considerable nonuniform electric field is caused to occur.

For this reason, in the case where halftone is displayed, when the electrophoretic particles is partially moved on a display electrode depending on an applied voltage, a relationship between the applied voltage and halftone level is largely deviated from a linear relationship, so that it becomes difficult to effect control. As a result, stable gradation cannot be displayed.

Further, in the case of displaying black, by applying a negative-polarity voltage to the pixel electrode 105 to collect the electrophoretic particles on the pixel electrode, the black display is effected. However, an electric field toward the central portion of the pixel G is very weak, so that the electrophoretic particles do not reach the pixel central portion, thus failing to provide a sufficient contrast.

In a strong electric field place, the charged electrophoretic particles and counter ions cause very large polarization, so that when a short circuit is caused between the electrodes after a voltage for moving the electrophoretic particles is applied between the electrodes, a depolarization field due to repulsion between particles and attraction force between the particles and the ions is generated to move the electrophoretic particles. As a result, a display memory characteristic is lost in some cases.

On the other hand, in a color electrophoretic display device, a color filter method is most simple. In a conventional color electrophoretic display device, the color filter is formed on an opposite substrate or a reflection electrode.

In the case of forming the color filter on the opposite substrate, a cell is assembled so that the color filter and the pixel are aligned with each other. However, in this case, a positional deviation of the color filter from the pixel is caused to occur. When such a positional deviation is caused to occur, color mixture occurs between adjacent pixels, so that it is necessary to provide the opposite surface with a black matrix by a positional alignment margin in order to prevent the color mixture.

However, in the case of providing the black matrix, it is difficult to obtain a high aperture ratio. Particularly, a lowering in aperture ratio is noticeable in the case of forming high definition pixels of not more than 150 ppi or using a plastic surface having a high thermal expansion coefficient.

On the other hand, in the case of forming the color filter on the reflection electrode, as shown in FIG. 18, it is possible to suppress the lowering in aperture ratio by directly forming color filters 109a, 109b and 109c at a pixel G. In such a cell structure, a residual DC leading to burn-in is caused to occur in some cases, thus impairing a memory characteristic.

As a countermeasure thereagainst, it is possible to use a method wherein on an insulating layer, i.e., a color filter, a transparent electrode is formed to prevent a residual DC of the insulating layer to remain thereat. However, the resultant structure is complicated and in addition, light absorption by the transparent electrode cannot be negligible.

For this reason, by it has been desired that the problems of the conventional electrophoretic display device are remedied to retain the memory characteristic and improve a brightness.

DISCLOSURE OF THE INVENTION

A principal object of the present invention is to provide an electrophoretic display device or apparatus having solved the above described problems of the conventional electrophoretic display device.

An object of the present invention is to provide an electrophoretic display device or apparatus capable of retaining a memory characteristic and improving a brightness.

According to an aspect of the present invention, there is provided an electrophoretic display device, comprising:
  a substrate,
  a partition wall disposed on a surface of the substrate,
  a liquid layer, disposed in a container defined by the substrate and the partition wall, comprising electrophoretic particles and a dispersion medium,
  a first electrode formed at a position apart from the partition wall on the substrate,
  a second electrode formed along the partition wall, and
  means for applying a voltage between the first electrode and the second electrode,
  wherein at the surface of the substrate defining the container, a resistance layer electrically connecting the first electrode and the second electrode is formed, and the electrophoretic particles in the container are moved between a surface of the partition wall and a surface of the resistance layer to effect display.

According to another aspect of the present invention, there is provided an electrophoretic display apparatus, comprising:
  a substrate,
  a partition wall disposed on a surface of the substrate,
  a liquid layer, disposed in a container defined by the substrate and the partition wall, comprising electrophoretic particles and a dispersion medium,
  a first electrode formed at a position apart from the partition wall on the substrate,
  a second electrode formed along the partition wall,
  a plurality of data lines disposed on the substrate at a certain pitch, a plurality of scanning lines and a plurality of constant-voltage lines, the scanning lines and the constant-voltage lines being disposed on the substrate at a certain pitch while intersecting with the plurality of data lines, and
  a switching device and a capacitor which are disposed at each of the intersections of the data lines and the scanning lines, the capacitor holding a voltage depending on display data by supplying a sequential scanning signal to the scanning lines and supplying a data signal to the data lines and depending on the voltage held by the capacitor, a voltage or a current being applied between the first and second electrodes so as to move the electrophoretic particles to effect display,
  wherein at the surface of the substrate defining the container, a resistance layer for electrically connecting the first electrode and the second electrode is formed, and the electrophoretic particles in the container are moved between a surface of the partition wall and a surface of the resistance layer.

These and other objects, features and advantages of the present invention will become more apparent upon a consideration of the following description of the preferred embodiments of the present invention taken in conjunction with the accompanying drawings.

BEST MODE FOR CARRYING TO THE INVENTION

Hereinbelow, embodiments for carrying out the present invention will be described with reference to the drawings.

First Embodiment

Figure 1:
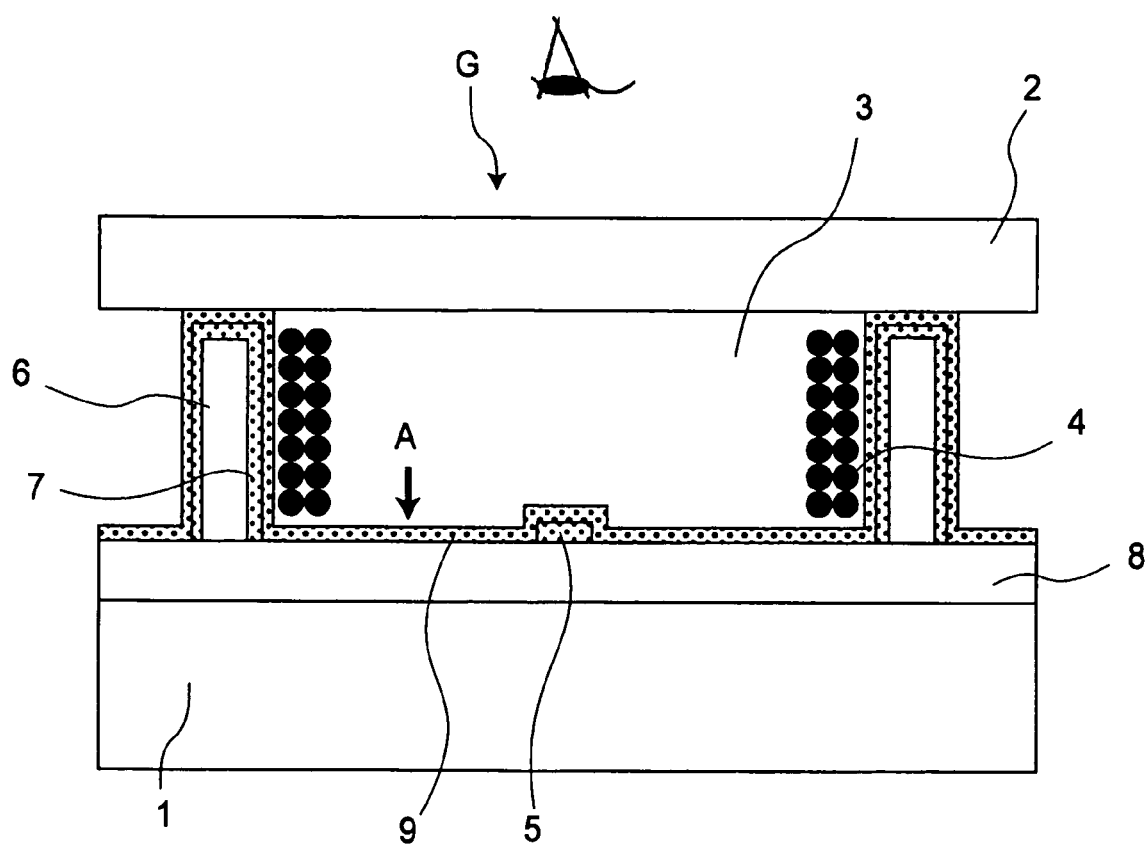
FIG. 1 is a schematic sectional view showing a constitution of an electrophoretic display device according to First Embodiment of the present invention.

FIG. 1 shows a schematic structural view of an electrophoretic display device according to this embodiment of the present invention.

In FIG. 1, the electrophoretic display device includes a substrate 1, a sealing plate 2 disposed opposite to the substrate 1, and a pixel G. The sealing plate 2 is formed of a light-transmissive material, such as transparent glass or a transparent film. Incidentally, the substrate 1 is not necessarily required to be transparent and rigid and thus may be constituted by a film substrate, a metal substrate, or the like.

On the substrate 1, a display substrate-forming member 8 is formed of a transparent material or a material colored a desired color. Examples of the materials may include: plastics, such as acrylic resin, epoxy resin, silicone resin; and glass. In these materials, it is possible to mix inorganic oxide pigments, such as titanium oxide, zinc oxide, and aluminum oxide, or a dye to provide the material with color or light scattering characteristic.

On the display substrate-forming member 8, a first electrode 5 is formed of, e.g., an ITO (indium tin oxide) film or a metal film such as Al film. The first electrode 5 has a size which is not more than 30% of a pixel size and may have any shape. However, in order to sufficiently uniformize an electric field in a liquid layer, the first electrode 5 may preferably have a size of not more than 10% of the pixel size and a shape similar to the pixel G.

Figure 2:
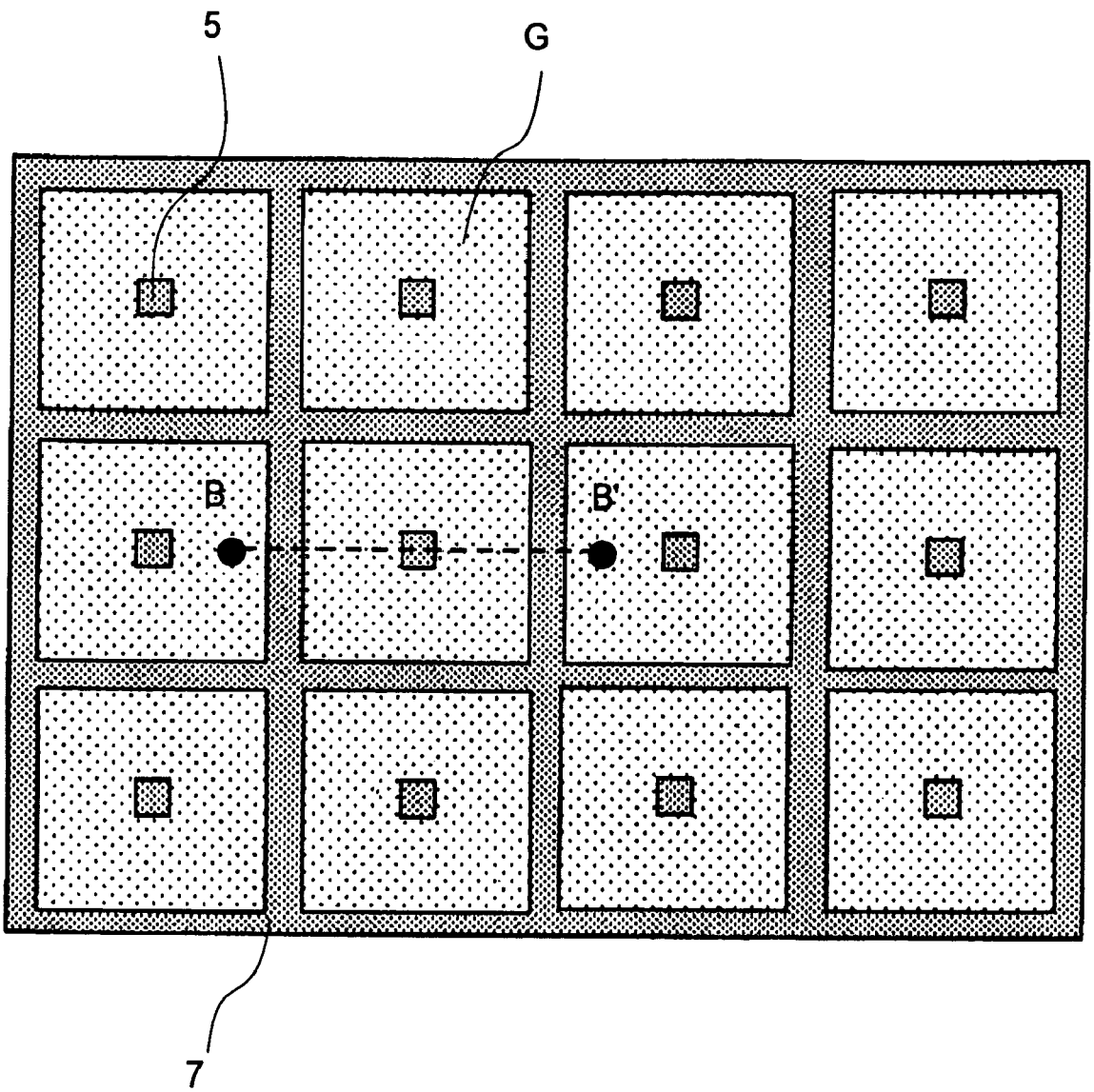
FIGS. 2, 3(a) and 3(b) are plan views each showing a constitution of pixels in the electrophoretic display apparatus.
Figure 3:
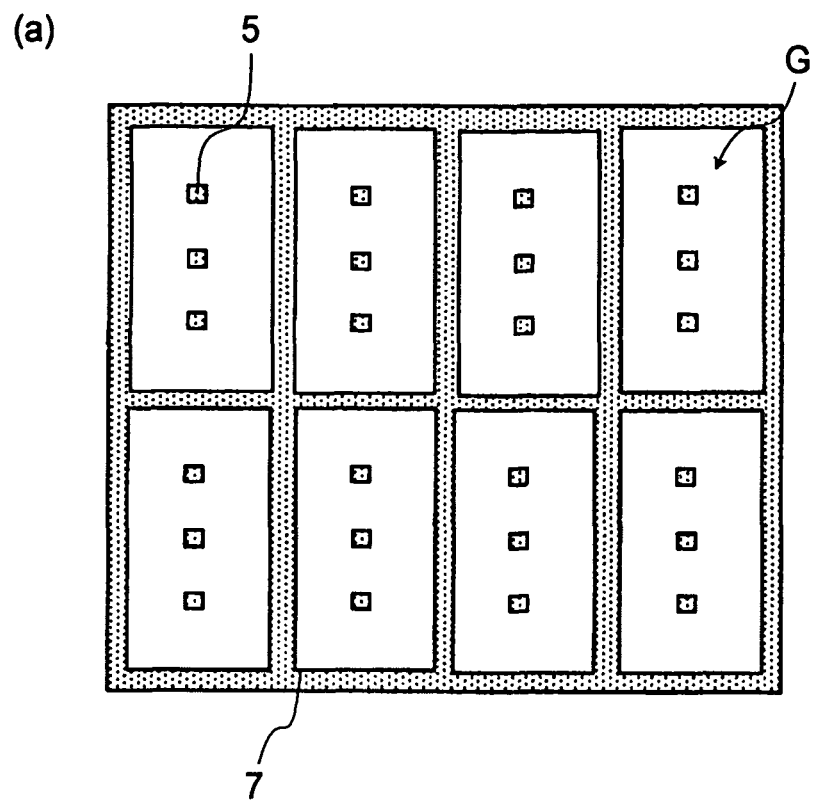
Figure 3:
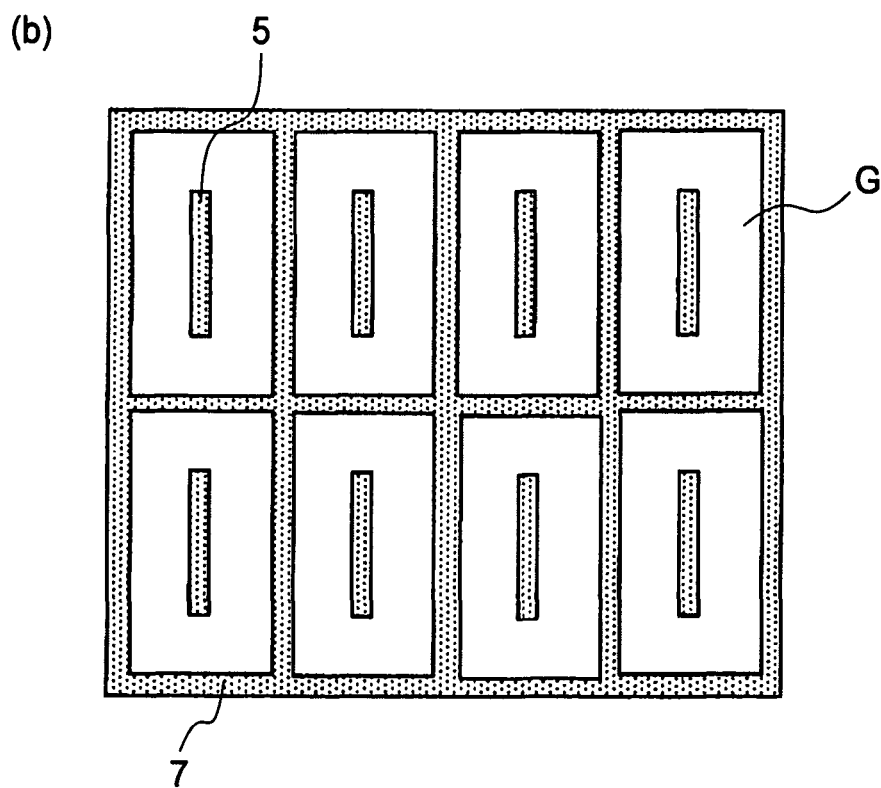

FIG. 2 is a plan view showing a constitution of the pixel G in this embodiment. In each of the pixels G within a pitch of 50 μm, a square-shaped (5 μm×5 μm) first electrode 5 is formed in a size of 1% of the pixel G size. In the case where the pixel G has a rectangular shape, the first electrode 5 may be disposed at several portions discretely as shown in FIG. 3(a) or in a line-like shape as shown in FIG. 3(b).

Referring again to FIG. 1, between the substrate 1 and the sealing plate 2, a partition wall 6 for keeping a spacing therebetween at a predetermined level and partitioning adjacent pixels is formed, in a thickness of ordinarily 5-30 μm, of a generally used material, such as a resist material, a thermoplastic material, an ultraviolet curable material, or the like. At a substrate of the partition wall 6, a second electrode 7 may be formed of not only a film of metal, such as Al or Ti but also the ITO film.

Thereafter, a resistance layer 9 is formed to over the second electrode 7 and the first electrode 5 so that a current flows therebetween depending on a voltage applied between the first and second electrodes 5 and 7. The resistance layer has continuously different potentials at respective positions from a positive close to the first electrode to a position close to the second electrode. More specifically, voltages between the second electrode and respective points on the resistance layer are larger at the positions closer to the first electrode and smaller at the positions closer to the partition wall i.e., the second electrode. As a result, the electric field in the liquid layer is uniformized with respect to a distance from the second electrode, so that ideally, all the electrophoretic particles are moved simultaneously. For this reason, it is possible to prevent the electrophoretic particles from remaining in a weak electric field place. Further, a control accuracy of movement of the electrophoretic particles is improved, so that it is possible to easily create an intermediary state.

In this embodiment, the first electrode is not an electrode for collecting the particles thereon, so that the particles are moved between the resistance layer and the second electrode on the partition wall. In order to broaden an effective area for display, the first electrode is formed in an area as small as possible so as to contact the resistance layer and disposed at a position most distant from the partition wall.

As a material for the resistance layer 9, it is possible to use a light-transmissive material including: films of organic compounds, such as polysilane, polysiloxane, polyacetylene, composites thereof, copolymers thereof, and the like; inorganic films, such as ITO film; semiconductor films, such a silicon film; and electroconductive resin films obtained by adding an electroconductive filler, such as metal powder or carbon particles in epoxy resin, polypropyrene, or the like. The resistance layer may be prepared as an interfacial member by laminating these films. The resistance layer may desirably have a volume resistivity of $10^6$-$10^{12}$ ohm·cm and a thickness of 1-200 nm.

A sheet resistance of the resistance layer is determined, as described later, on the basis of a relationship between an electric resistance R between the first and second electrodes and an auxiliary capacitance of the pixel since the resistance R has to be determined based on the relationship thereof with the auxiliary capacitance of the pixel. More specifically, when the auxiliary capacitance is 1 pF, the resistance R may preferably be not less than 100 G ohm. Accordingly, a sheet resistance of $10^{11}$ ohm/□ or larger. This corresponds to a volume resistivity of $10^6$ ohm·cm when the layer thickness is 100 nm.

Incidentally, in this embodiment, in order to simplify the production process of the electrophoretic display device, the resistance layer 9 is formed to cover the first and second electrodes 5 and 7 but may be disposed therebetween so as to ensure electrical connection between the first and second electrodes 5 and 7 through the resistance layer 9.

A portion surrounded by the substrate 1 and the partition wall constitutes a container for an electrophoretic liquid 3. In the container, a liquid layer dispersion medium and electrophoretic particles 4 dispersed in the dispersion medium are filled and sealed with the sealing plate 2. As the dispersion medium, it is possible to use water, methanol, ethanol, acetone, hexane, toluene, aromatic hydrocarbon such as benzene having a long-chain alkyl group, and other various oil-like compounds, singly or in mixture of these compounds together with a surfactant or the like.

The electrophoretic particles 4 are organic or inorganic particles having such a property that they are moved in the dispersion medium by electrophoretic migration attributable to a potential difference. Examples thereof may include particles of one or two or more species of pigments including: black pigments, such as aniline black, carbon black, and the like; white pigments, such as titanium dioxide, antimony trioxide; azo pigments; and other colored pigments.

In these pigments, as desired, it is possible to add a charge control agent comprising particles of an electrolyte, a surfactant, a resin, a rubber, oil, etc.; a dispersing agent, such as a titanium-based coupling agent, an aluminum-based coupling agent, a silane-based coupling agent, or the like; a lubricant; a stabilizer; and so on.

In this embodiment, between the first electrode 5 and the second electrode 7, a drive voltage generation apparatus for generating a drive voltage is connected and will be described specifically later with reference to FIGS. 9 and 10.

Next, an operation of the thus constituted electrophoretic display device will be described. In the following description, the case of positively-charged electrophoretic particles 4 are described as an example but the case of negatively-charged electrophoretic particles 4 can be similarly described in consideration of an opposite direction of movement of the electrophoretic particles.

Figure 4:
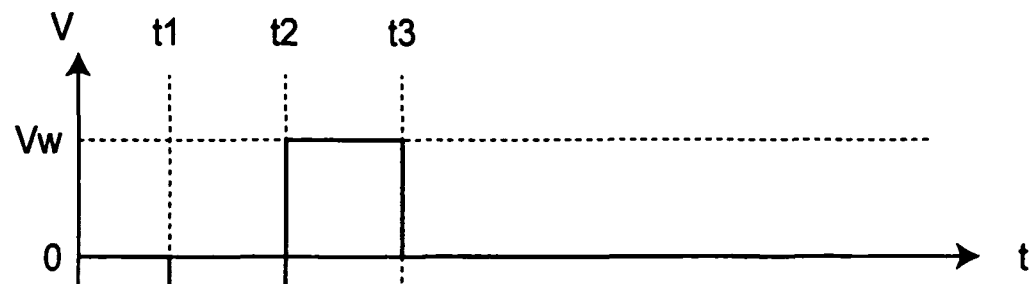
FIGS. 4(a), 4(b) and 4(c) are drive waveform diagrams of the electrophoretic display apparatus.
Figure 4:
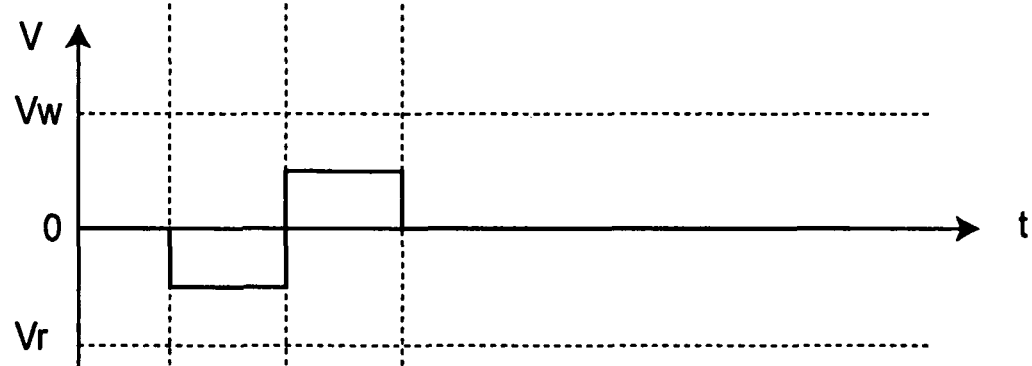
Figure 4:
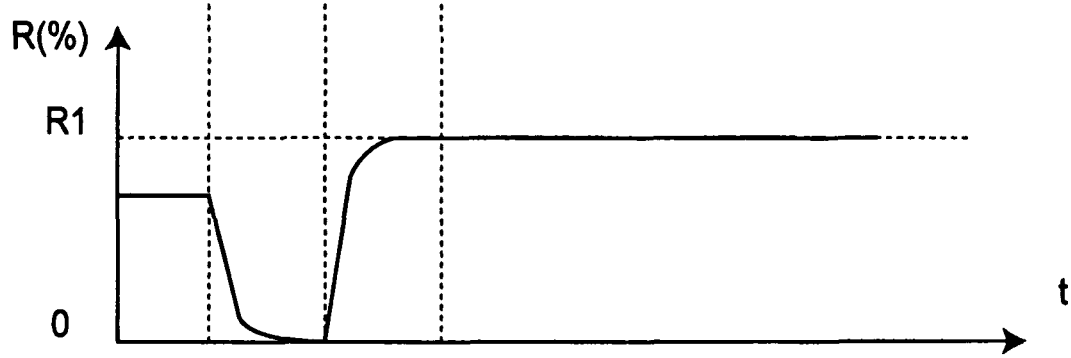

FIGS. 4(a) to 4(c) show drive waveform diagrams, wherein a potential of the second electrode 7 is 0 V and a potential of the first electrode 5 is shown in FIG. 4(a), FIG. 4(b) shows a potential of the resistance layer (electroconductive film potential) at a point A indicated in FIG. 1, and FIG. 4(c) shows an optical response. In FIGS. 4(a) to 4(c), a period between times t1 and t2 is a reset period, and a period between times t2 and t3 is a writing period.

In the reset period, a reset voltage Vr is applied in order to place the electrophoretic particles uniformly in a predetermined position. At this time, a potential of the resistance layer 9 at the point A shown in FIG. 1 is an intermediary potential between the second electrode potential (0 V) and the first electrode potential (Vr).

Thereafter, in the writing period, a writing voltage Vw is applied and similarly the resistance layer potential is also changed. As a result, due to a resistive partial voltage, the resistance layer potential is lower than the first electrode potential (Vw).

After the writing, the applied voltage is lowered to 0 V and the writing period is changed to a display state retention period. In this period, when a normal direction resistance of the resistance layer 9 on the first electrode and a normal direction resistance thereof on the second electrode are made sufficiently smaller than a resistance of the liquid layer between the first and second electrodes, a residual DC does not remain. As a result, an electric field in opposite direction is not generated immediately after the applied voltage is lowered to 0 V, so that a memory characteristic is not impaired.

Figure 5:
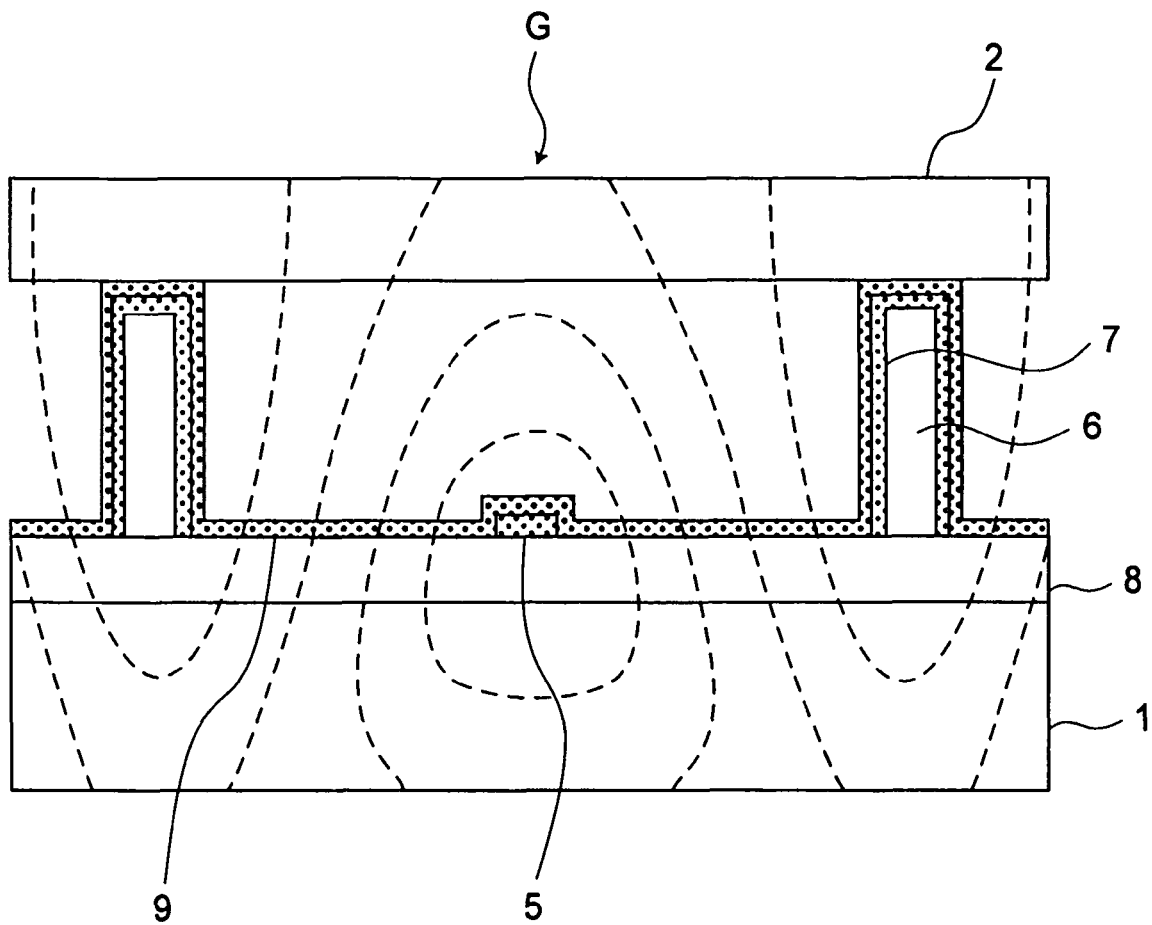
FIG. 5 is a sectional view for illustrating an equipotential line in a drive state of the electrophoretic display device.

Incidentally, by connecting the first electrode 5 and the second electrode 7 via the resistance layer 9 as described above, in the case of applying a drive voltage, a potential gradient is generated in the resistance layer, so that the potential of the resistance layer 9 is smaller at a position closer to the second electrode 7 and larger at a position more distant from the second electrode 7, due to the resistive partial voltage. FIG. 5 shows a state of equipotential line in this case. As shown in FIG. 5, a spacing between equipotential lines between the first and second electrodes 5 and 7 is considerably larger than that in the case of the conventional electrophoretic display device, so that the electric field in the neighborhood of the partition wall.

Accordingly, an extreme nonuniformity of the electric field in the liquid layer is removed, so that an electric field applied to the electrophoretic particles is also substantially uniform. By uniformizing the electric field, it becomes possible to easily control an amount of movement of the electrophoretic particles by changing a pulse width of an applied voltage pulse. As a result, it is possible to effect stable halftone display.

Further, the first electrode 5 is formed at a central portion of the display pixel G, so that a horizontal electric field directed toward the central portion at the time of displaying black is generated. For this reason, the electrophoretic particles reach the central portion to remarkably improve a contrast. Further, by the electric field uniformization, it is possible to suppress an occurrence of depolarization field due to polarization between particles and ions, so that a sufficient memory characteristic can also be obtained.

Second Embodiment

Figure 6:
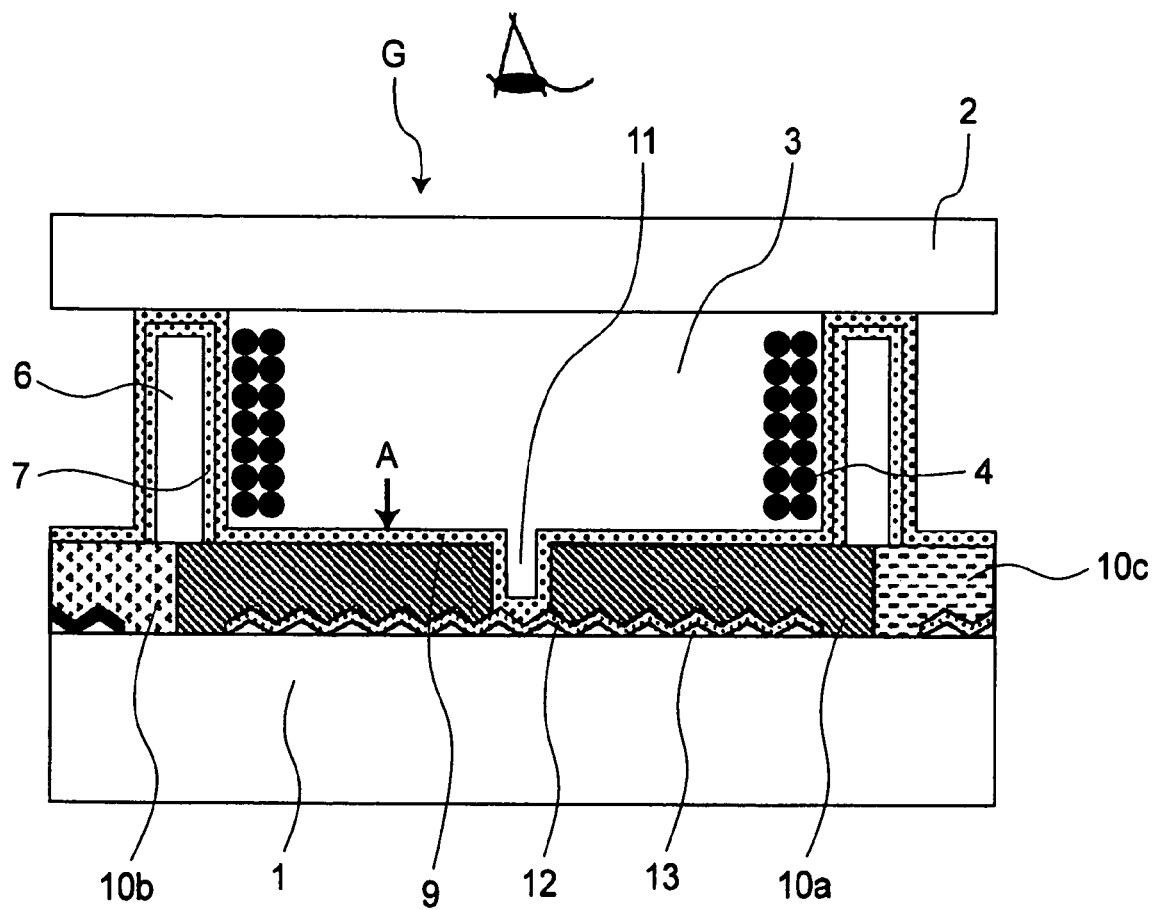
FIG. 6 is a schematic sectional view showing a constitution of an electrophoretic display device according to Second Embodiment of the present invention.

FIG. 6 is a schematic sectional view showing a constitution of an electrophoretic display device according to this embodiment. In FIG. 6, the same reference numerals as in FIG. 1 represent the same or corresponding portions as in FIG. 1.

In the electrophoretic display device shown in FIG. 6, an unevenness portion 13 is formed on a substrate 1 and a first electrode 12 is formed on an upper surface of the unevenness portion 13. The unevenness portion 13 can be formed by, e.g., applying a photosensitive resin onto the substrate 1 and then performing light exposure and wet development or by such a method that a minute unevenness is provided on a glass plate. As a material for the first electrode 12 formed on the unevenness portion 13, it is possible to use a material, having a high reflectance, such as Al or Ag.

As described above, by forming the first electrode 12 on the unevenness portion 13, it is possible to impart a light diffusion function to the first electrode 12. Further, by controlling a distribution of inclination angle at the unevenness portion 13, it is possible to not only increase a viewing angle but also permit effective reflection of external light, so that it is possible to effect bright and good display compared with the case of First Embodiment. Further, it becomes possible to retain a reflectance without using an ITO electrode to simplify a production process.

On the first electrode 12, coloring layers 10a, 10b and 10c are formed to constitute an insulating layer. These coloring layers 10a, 10b and 10c are constituted by an ultraviolet (UV) curable-type acrylic resin resist in which a red pigment, a green pigment, or a blue pigment is dispersed, respectively. These coloring layers 10a, 10b and 10c generally have a thickness of approximately 0.5-4 μm. At a central portion of a pixel G, a contact hole 11 is formed. A resistance layer 9 is formed to cover a partition wall 6 formed on the coloring layers together with a second electrode 7, the coloring layers 10a, 10b and 10c, and the contact hole 11, whereby the first electrode 12 and the second electrode 7 are electrically connected with each other through the resistance layer 9 formed in the contact hole 11.

Further, in this embodiment, the contact hole 11 is formed at a position most distant from the second electrode 7, i.e., at a substantially central portion of the pixel G, whereby a potential difference between the central portion of the pixel G and the second electrode 7 becomes largest. As a result, an electric field in a horizontal (in-plane) direction toward the central portion of the pixel G is generated at the time of black display, so that the electrophoretic particles 4 reach the pixel central portion to considerably improve a contrast.

Next, an operation of the thus constituted electrophoretic display device will be described. In the following description, the case of positively-charged electrophoretic particles 4 are described as an example but the case of negatively-charged electrophoretic particles 4 can be similarly described in consideration of an opposite direction of movement of the electrophoretic particles.

Figure 7:
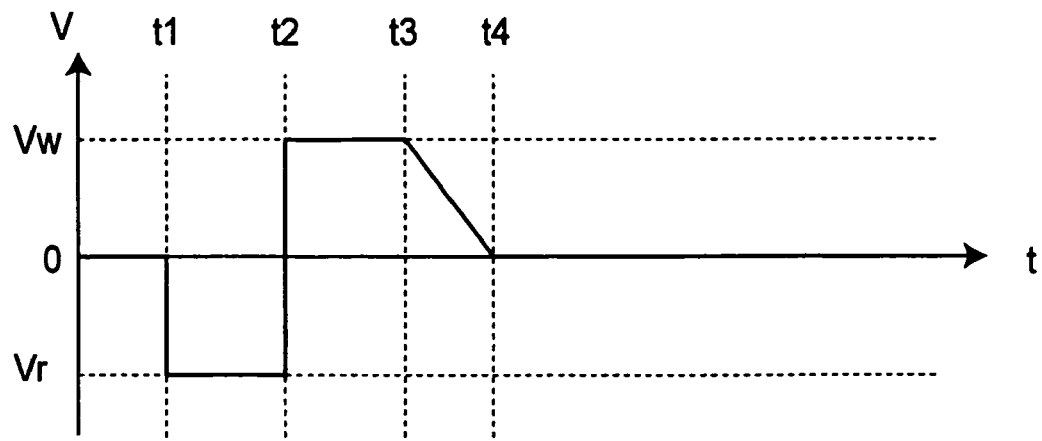
FIGS. 7(a), 7(b) and 7(c) are drive waveform diagrams of the electrophoretic display device in Second Embodiment.
Figure 7:
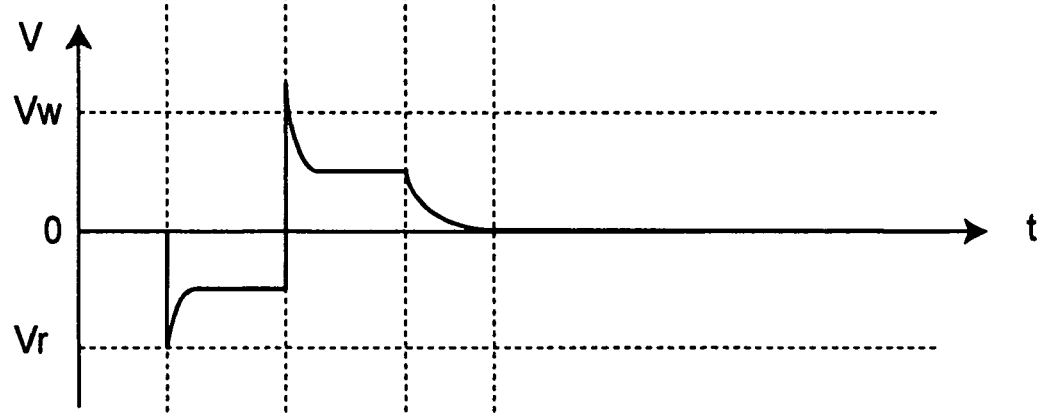
Figure 7:
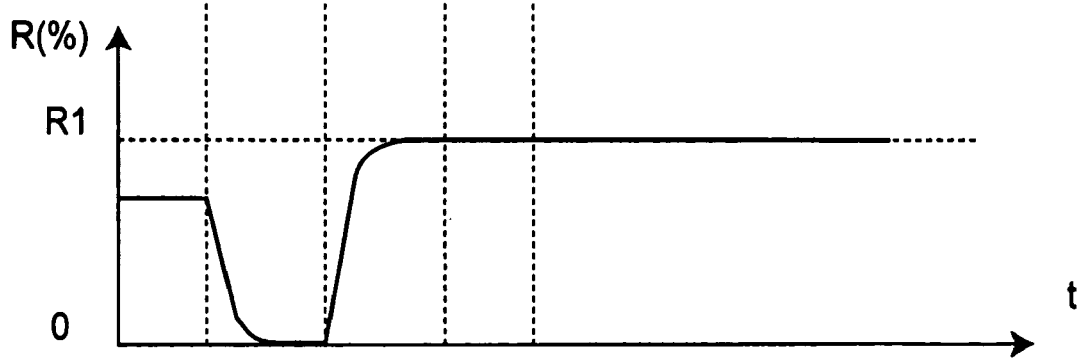

FIGS. 7(a) to 7(c) show drive waveform diagrams, wherein a potential of the second electrode 7 is 0 V and a potential of the first electrode 5 is shown in FIG. 7(a), FIG. 7(b) shows a potential of the resistance layer (electroconductive film potential) at a point A indicated in FIG. 6, and FIG. 7(c) shows an optical response. In FIGS. 7(a) to 7(c), a period between times t1 and t2 is a reset period, and a period between times t2 and t3 is a writing period, and a period between times t3 and t4 is a voltage off transition period.

At the time t1, a reset voltage Vr is applied in order to place the electrophoretic particles uniformly in a predetermined position. Immediately after the application of the reset voltage Br, a potential of the resistance layer 9 at a point A shown in FIG. 6 is substantially identical to that of the applied voltage since the potential is divided at a ratio of capacitance between the resistance layer 9 and the first electrode 12 and a capacitance between the coloring layers (insulating layer) 10a, 10b and 10c and the first electrode 12. However, thereafter, the potential is settled at a predetermined voltage by the resistive voltage division of the resistance layer 9. A time constant thereof is adjustable by the resistance of the resistance layer 9 and the capacitance created between the resistance layer 9 and the first electrode.

Thereafter, when the writing voltage Vw is applied in the writing period, the potential of the resistance layer is not less than the voltage Vw by capacitance voltage division but is settled at a predetermined voltage in the resistive voltage division at the same time constant as in the reset period. Then, as shown in FIG. 7(c), after the potential is a predetermined gradation level, the operation is performed in the voltage off transition period.

Immediately after the time t3, when the applied voltage is changed to 0 V, an opposite-polarity electric field is generated by electric charges remaining between the resistance layer 9 and the first electrode to impair the memory characteristic. For this reason, when the first electrode potential is gradually changed to 0 V at a time constant longer than the time constant of the cell, it is possible to suppress an occurrence of the opposite-polarity electric field, so that it becomes possible to retain the memory characteristic.

More specifically, the voltage for display is applied between the first electrode 12 and the resistance layer 9 and then is changed to substantially 0 V at a time constant larger than a time constant determined by a capacitance of the coloring layers (insulating layer) 10a, 10b and 10c and the resistance layer 9, whereby it becomes possible to lower the applied voltage to 0 V at a longer time constant than a time constant of the residual DC remaining in the coloring layers (insulating layer) 10a, 10b and 10c. As a result, it is possible to suppress application of the opposite-polarity voltage to the liquid layer, so that a good memory characteristic can be obtained without moving the electrophoretic particles in the opposite direction.

Third Embodiment

Figure 8:
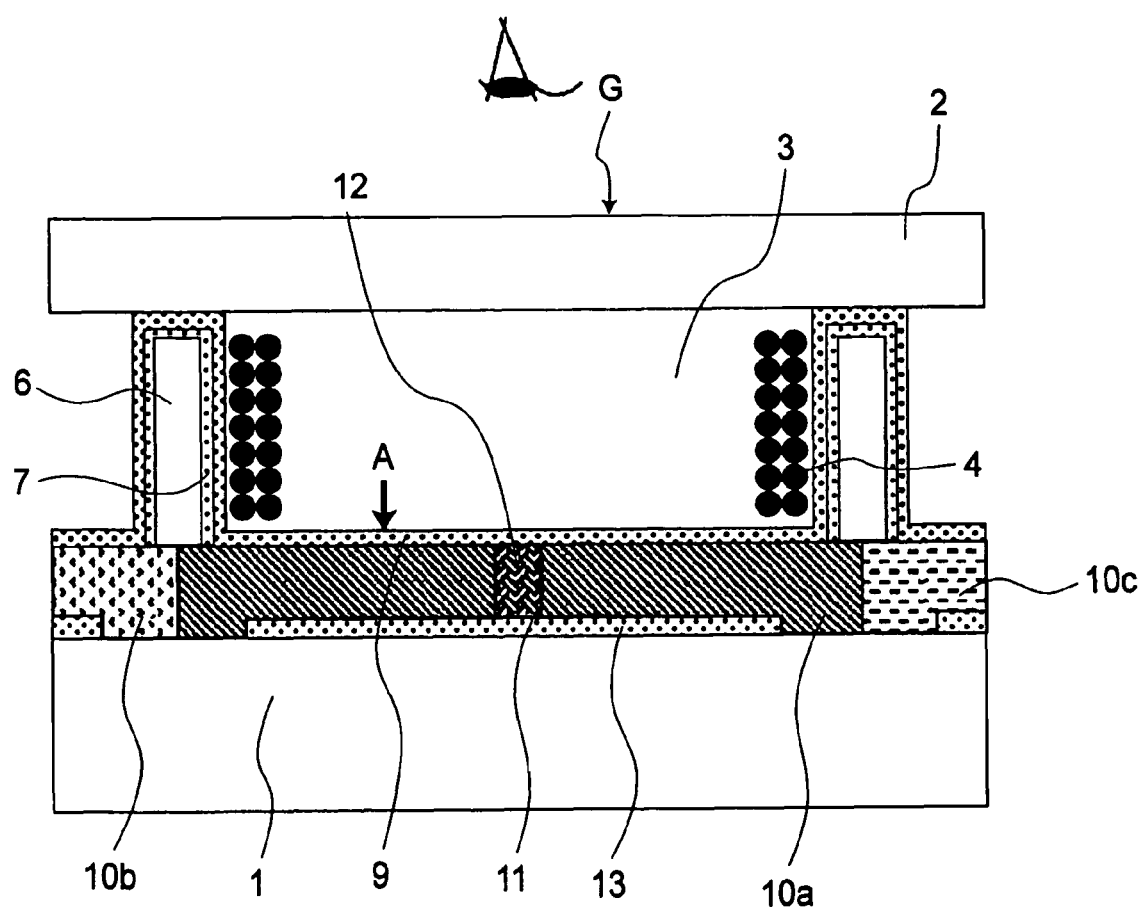
FIG. 8 is a schematic sectional view showing a constitution of an electrophoretic display device according to Third Embodiment of the present invention.

FIG. 8 is a schematic sectional view showing a constitution of an electrophoretic display device according to this embodiment. In FIG. 8, the same reference numerals as in FIG. 6 represent the same or corresponding portions as in FIG. 6.

In the electrophoretic display device shown in FIG. 8, a connection material 12 is filled in the contact hole 11 in which the first electrode 5 and the resistance layer 9 are electrically connected through the connection material 12. By providing such a constitution, a stepwise portion at the surface of the resistance layer 9 can be reduced, so that it is possible to solve such a problem that the electrophoretic particles 4 are attached to the stepwise portion at the contact hole portion.

Incidentally, as a material for the connection material 12, a material having a low resistance than that of the resistance layer 9 is preferred. It is possible to use metal such as Al or Ti; ITO; electroconductive resin. When the resistance of the connection material is low, it is possible to suppress a potential drop due to the resistance of the connection material 12 at the contact hole portion, so that it is possible to efficiently apply a voltage to the liquid layer compared with the case of Second Embodiment. As a result, a desired voltage can be applied to the liquid layer. Further, in the case where the connection material 12 is metal, it is possible to sufficiently lower the resistance at the connection portion even when the contact hole 11 has a small size. For this reason, an area of an effective portion for display is increased, so that it is possible to effect bright and good display.

Figure 9:
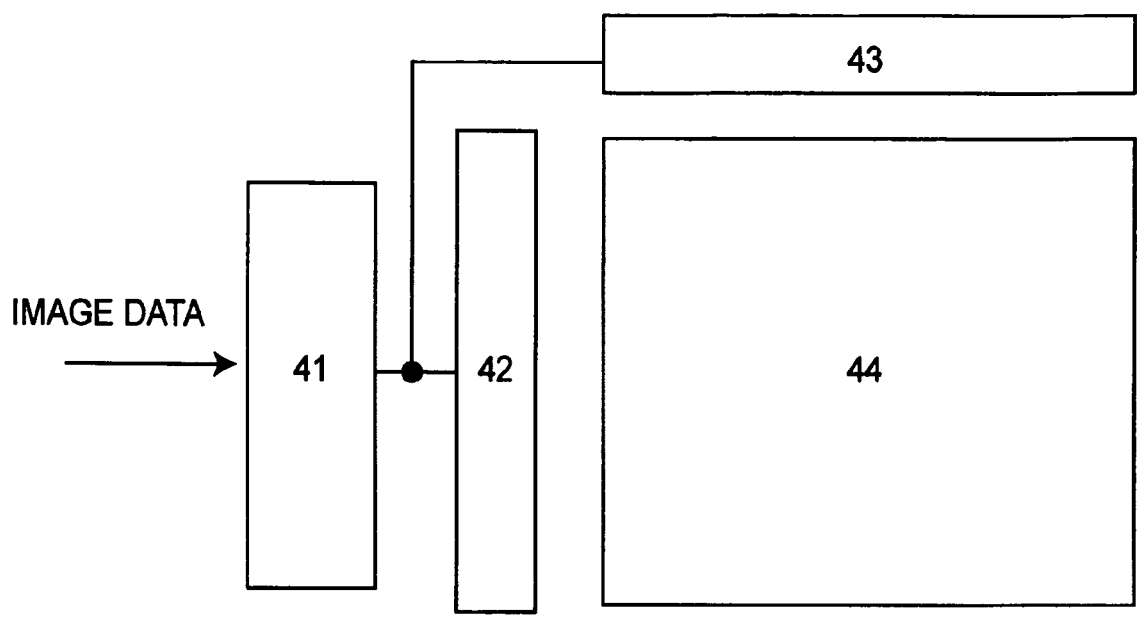
FIG. 9 is a block diagram showing a system constitution of an electrophoretic display apparatus using the electrophoretic display device according to any one of First, Second and Third Embodiments as a display panel.

FIG. 9 is a block diagram showing a system constitution of an electrophoretic display apparatus using the electrophoretic display device according to any one of First to Third Embodiments, as a display panel. In FIG. 9, the electrophoretic display apparatus includes a panel controller 41, a source driver 42, a gate driver 43, and an electrophoretic display panel 44.

The panel controller 41 generates display data and control signals, such as a field synchronizing signal, a horizontal synchronizing signal, and data acquisition clock on the basis of inputted image data, and transfer them to the source driver 43 and the gate driver 42. The source driver 43 and the gate driver 42 output a drive voltage to the electrophoretic display panel 44 in accordance with the control signals and display data received from the panel controller 41. The display panel 44 effects display depending on the drive voltage.

The electrophoretic display panel 44 includes: a plurality of data lines disposed on a substrate with a certain pitch; a plurality of scanning lines and auxiliary capacitance lines which are disposed on the substrate with a certain pitch while sterically intersecting with the plurality of data lines, and a plurality of pixels G disposed with a certain pitch, each in correspondence with each of intersections of the data lines and the scanning lines (not shown).

Figure 10:
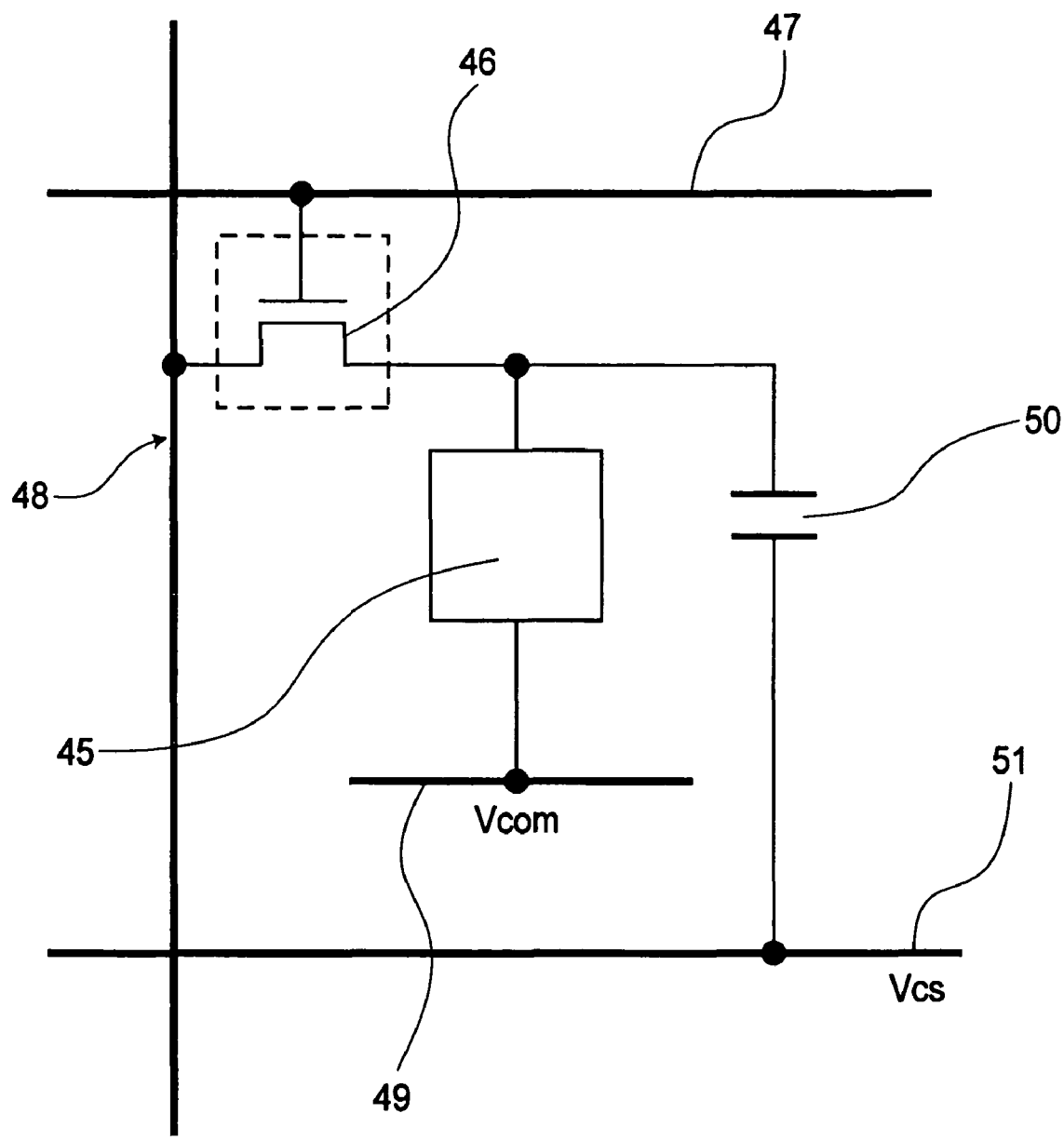
FIG. 10 is an equivalent circuit view at one pixel of an electrophoretic display panel of the electrophoretic display apparatus.

FIG. 10 is an equivalent circuit view at one pixel of the electrophoretic display panel 44 comprising, e.g., the electrophoretic display device (FIG. 6) according to Second Embodiment. The equivalent circuit includes a pixel 45 having the first electrode 12, which is connected with a drain electrode of a thin film transistor (TFT) 46 as a switching device for active matrix drive display, and the second electrode 7 which is connected with a common electrode 49 having a voltage Vcom. The second electrodes 7 at all the pixels are connected with the common electrode 49. A gate line 47 is connected with a gate electrode of the TFT 46, and a source line 48 is connected with a source electrode of the TFT 46. The TFT 46 is an n-type transistor.

Between the drain electrode of the TFT 46 and an auxiliary capacitance line 51, an auxiliary capacitor 50 providing a capacitance of the coloring layers is disposed. The auxiliary capacitors at all the pixels are connected with the auxiliary capacitance line 51 which has a constant voltage Vcs.

Hereinbelow, a specific method will be described.

Figure 11:
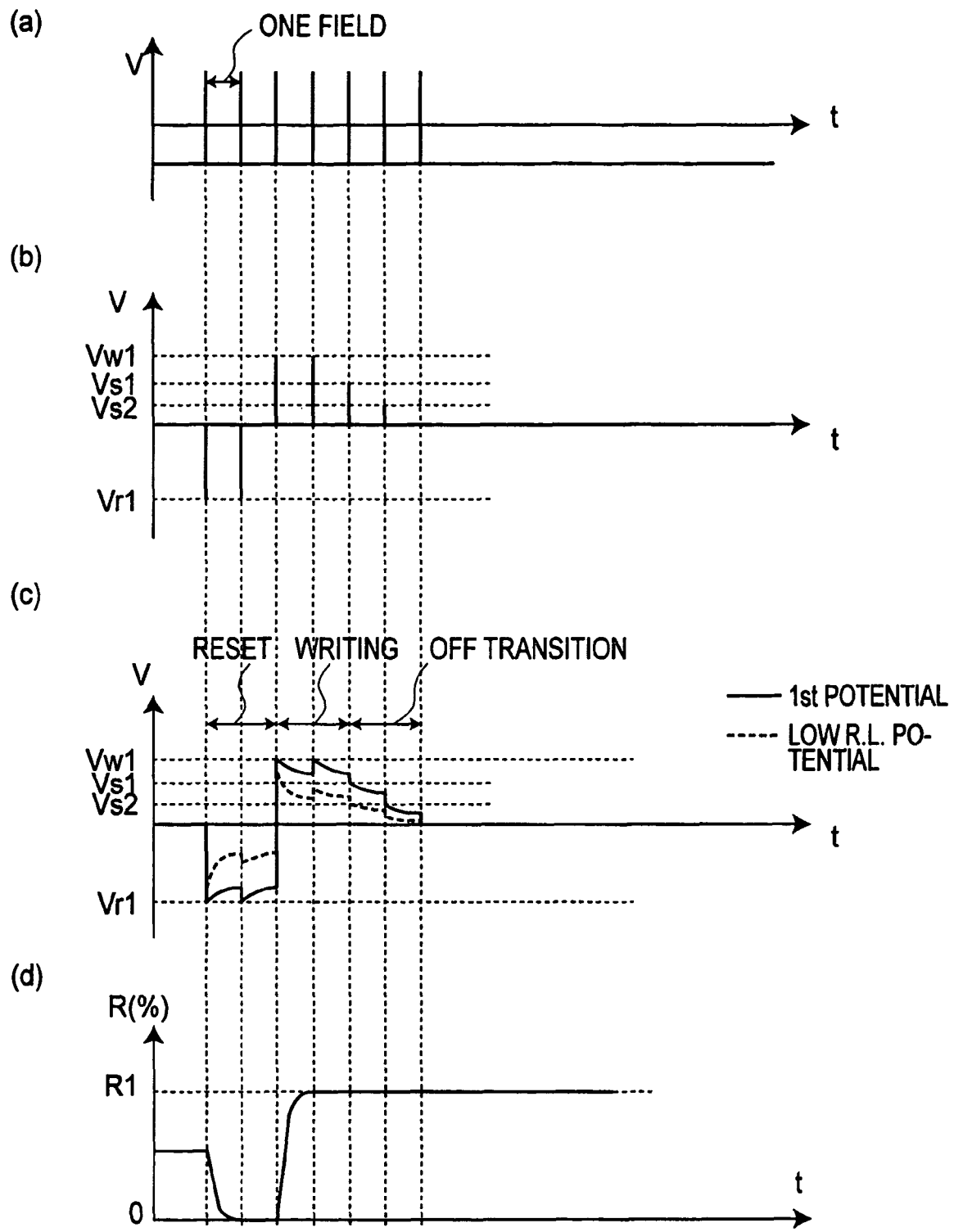
FIGS. 11(a) to 11(d) are drive waveform diagrams at one pixel of the electrophoretic display panel of the electrophoretic display apparatus.

FIGS. 11(a) to 11(b) show drive waveforms at certain one pixel of the electrophoretic display panel 44. Here, the potential of the second electrode 7 is 0 V. FIG. 11(a) shows a gate signal (scanning signal pulse) inputted from the gate driver 42, FIG. 11(b) shows a data (information) signal pulse inputted from the source driver 43 to the first electrode 12, FIG. 11(c) shows a first electrode potential waveform and a resistance layer potential waveform, and FIG. 11(d) shows an optical response.

Here, a drive period is constituted by three periods of a reset period, a writing period, and a voltage off transition period. In the present invention, a selection time of one scanning line may be constituted by those three periods but it is also possible to perform rewriting of picture area, in such a manner that only resetting is performed by one scanning and writing is performed by subsequent scanning, in a plurality of fields (hereinafter, one scanning period is referred to as "(one) field"). In the following description, the case where each period is consisting of two fields will be described but other cases, such as the case where the number of fields in respective periods are different, and the case where each period is consisting of not less than two fields can achieve the effects of the present invention, thus being of no problem.

In the reset period, in synchronism with the gate signal, a reset pulse Vr1 is applied from the source driver 43 to the source line 48, whereby the voltage Vr1 is written at the pixel (the first electrode 12). During a subsequent field period, the voltage is retained. At this time, the first electrode 12 and the second electrode 7 are electrically connected via the resistance layer 9, so that the first electrode potential is changed at a time constant determined by a resistance of the resistance layer 9 and the auxiliary capacitance 50. An amount of the change in first electrode potential can be decreased by adjusting the resistance of the resistance layer 9 and the auxiliary capacitance 50.

With respect to the resistance layer potential, similarly as in Second Embodiment described above, it is changed to a potential Vr1 by capacitive voltage division and then is settled at a resistive partial voltage of the resistance layer 9. Different from Second Embodiment, in this embodiment, the resistive partial voltage of the resistance layer 9 is also changed depending on the change in first electrode potential.

In a subsequent field in the reset period, the Vr1 is written again in the first electrode. At this time, the change in first electrode potential is small, so that a fluctuation in potential of the resistance layer 9 is also small. Thereafter, the potential is lowered similarly as in the case of the previous field.

When the drive period goes to the writing period, a voltage Vw1 is written in the first electrode 12 and then the voltage is held and a display state is changed from black to white by movement of the electrophoretic particles 4. At this time, the potential of the resistance layer is subjected to potential change in amount substantially equal to a difference in potential between the voltages Vr1 and Vw1, thus being higher than Vw1. Thereafter, the potential is settled at the resistive partial voltage of the resistance layer 9. The potential change in a subsequent field is the same as in the second field in the reset period.

In the subsequent voltage off transition period, a voltage Vs1 is written in a first field and a voltage Vs2 is written in a second field. The resistance layer potential is determined by resistive voltage division of the resistance layer 9, and is changed depending on the first electrode potential.

Here, when the voltage is changed to 0 V immediately after the writing period, the potential of the resistance layer is changed to that of an opposite polarity by electric charges remaining in the coloring layers. As a result, an electric field in an opposite direction is generated to impair the memory characteristic. In this embodiment, the voltage is lowered while satisfying a relationship: Vw1>Vs1>Vs2, whereby a time until the first electrode potential is attenuated to 0 V is longer than a time constant determined by the capacitance of the coloring layers and the resistance of the resistance layer.

On conditions that the coloring layers have a thickness of 1 μm and a dielectric constant of 3 and a pixel size is 50 μm×50 μm, a capacitance of the coloring layer portion sandwiched between the resistance layer 9 and the first electrode 12 is about 0.13 pF per one pixel except for the contact hole portion. When the resistance layer is formed so that a resistance between the common electrode and the first electrode is $10^{12}$ ohm, a time constant for removing the residual DC is about 13 ms. In this case, when the first electrode potential is attenuated to 0 V in a time period of 100 ms, the opposite-polarity electric field is not caused to occur. Thus, by providing the time, until the first electrode potential is attenuated to 0 V, longer than the time constant determined by the coloring layer capacitance and the resistance layer resistance, it is possible to lower the first electrode potential and the resistance layer potential to 0 V without generating the opposite-polarity electric field. As a result, the optical response after the writing period is capable of being not changed. Here, in an actual drive, a display switching speed may preferably be not more than 1 sec. and the attenuation time of the first electrode potential may also preferably be not more than 1 sec. Incidentally, the thickness and dielectric constant of the coloring layers and the resistance layer resistance may be any values so long as the time constant determined by the coloring layers and the resistance layer does not exceed the attenuation time.

According to the above described driving method, it is possible to improve an electric field nonuniformity in the neighborhood of the partition wall without causing the electric field applied in the opposite direction, so that it becomes possible to considerably improve the memory characteristic, the contrast, and the display qualities of the electrophoretic display panel.

Figure 12:
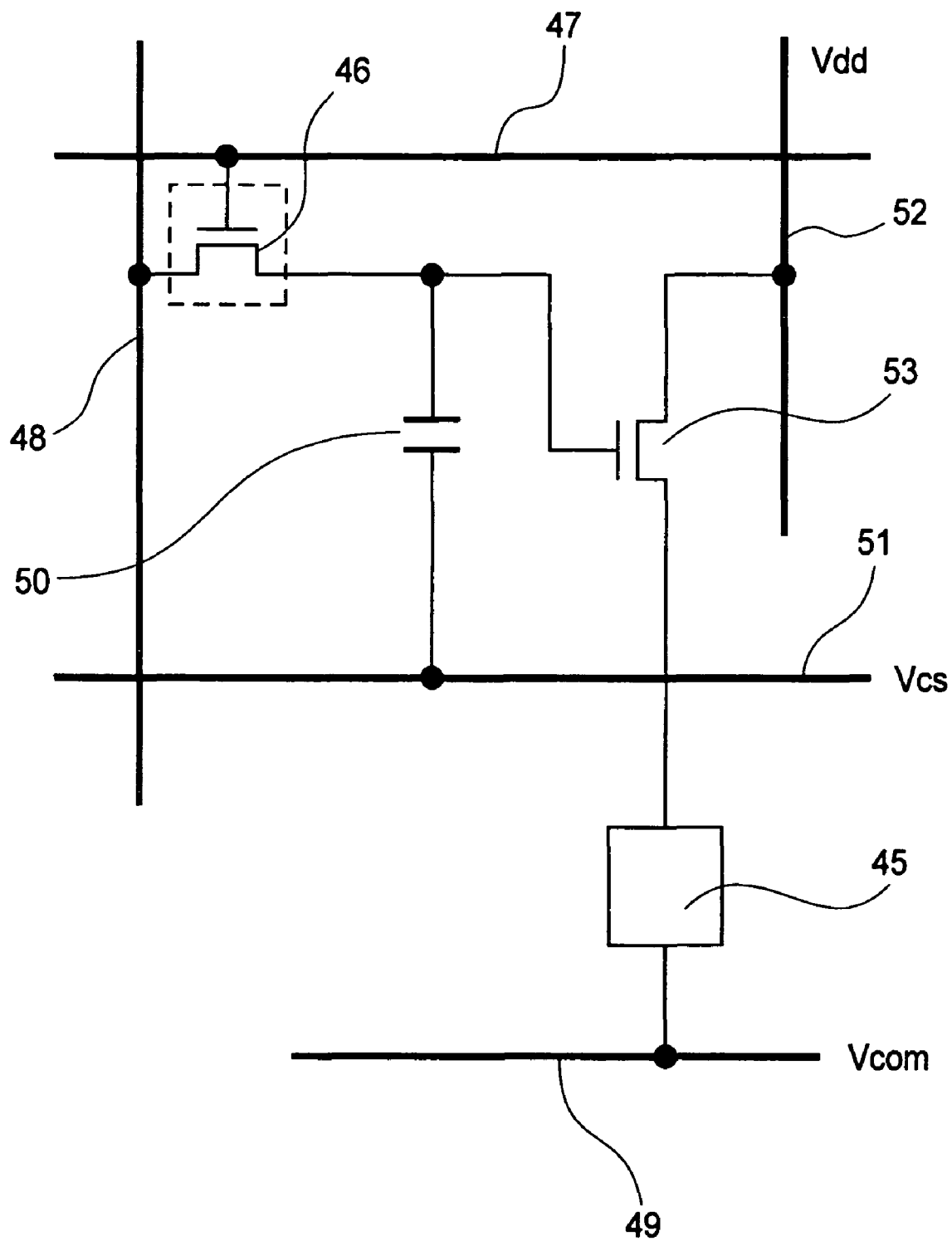
FIG. 12 is another equivalent circuit view at one pixel of an electrophoretic display panel of the electrophoretic display apparatus.

FIG. 12 is another equivalent circuit view at one pixel of the electrophoretic display panel 44, wherein a drive power source line 52 and a voltage control TFT 53 are added compared with the case of the equivalent circuit shown in FIG. 10. The voltage control TFT 53 is an n-type transistor similarly a the pixel TFT 46.

To a source electrode and a drain electrode of the voltage control TFT 53, the drive power source line 52 and the first electrode of the pixel 45 are connected, respectively. To the gate electrode, the drain electrode of the pixel TFT 46 is connected.

Hereinbelow, a specific method will be described.

Figure 13:
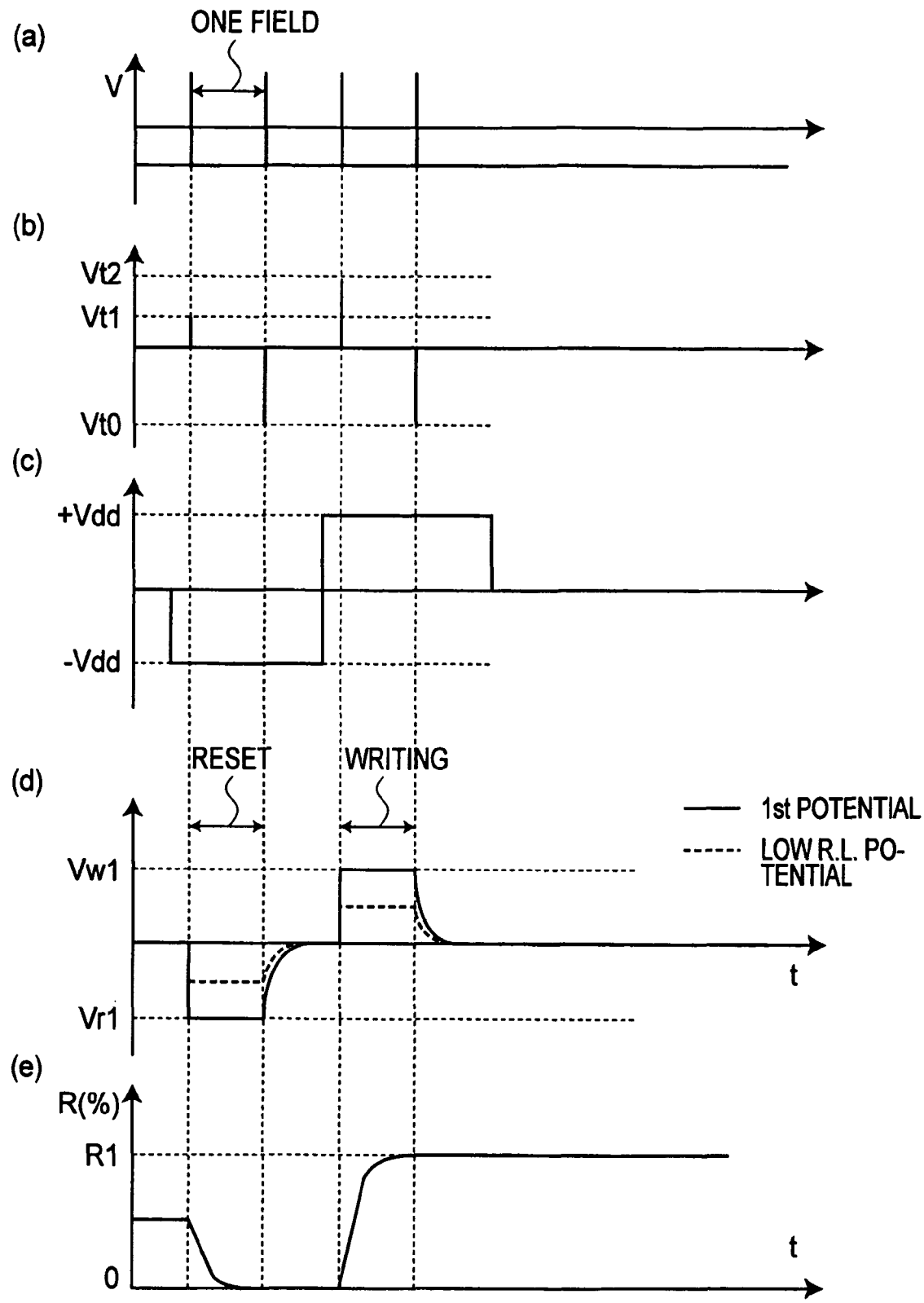
FIGS. 13(a) to 13(e) are drive waveform diagrams at one pixel of the electrophoretic display panel of the electrophoretic display apparatus.

FIGS. 13(a) to 13(e) show drive waveforms at certain one pixel of the electrophoretic display panel 44. Here, the potential of the second electrode 7 is 0 V. FIG. 13(a) shows a gate signal (scanning signal pulse) inputted from the gate driver 42, FIG. 13(b) shows a signal line potential (data (information) signal pulse) inputted from the source driver to the pixel, FIG. 13(c) shows a Vdd signal, FIG. 13(d) shows a first electrode potential waveform and a resistance layer potential waveform, and FIG. 13(e) shows an optical response.

In a reset period, in synchronism with the gate signal, a pulse Vt1 is applied from the source driver 43 and written in the gate of the voltage control TFT 53. At this time, the potential of the second electrode 7 is 0 V and the voltage of the drive power source line 52 is −Vdd, so that a potential difference of −Vdd is given between the second electrode and the drive power source line.

Here, on condition that a resistance between the source and the drain of the voltage control TFT 53 is controlled by the gate voltage and the resistance under application of the voltage Vt1 is sufficient smaller than the resistance of the resistance layer between the second electrode and the first electrode, the first electrode potential is substantially −Vdd by resistive voltage division. As a result, it is possible to effect a reset operation of the electrophoretic particles.

In a subsequent field, a voltage Vt0 is written in the gate of the voltage control TFT 53 to place the voltage control TFT 53 in an OFF-state. Here, the OFF state of the voltage control TFT 53 means that the source-drain resistance of the voltage control TFT 53 is higher than the resistance layer resistance, so that the first electrode potential approaches the second electrode potential as the result of resistive voltage division.

Thereafter, in order to apply a writing voltage to the liquid layer in a subsequent writing period, the voltage of the drive power source line is changed to +Vdd but the voltage control TFT 53 is placed in the OFF-state. As a result, the first electrode potential is not changed.

In a subsequent field, a voltage Vt2 is written in the gate of the voltage control TFT 53, whereby the source-drain resistance of the voltage control TFT 53 is lowered. Here, by the resistive voltage division, the first electrode potential is controlled by the gate voltage of the voltage control TFT 53, so that a voltage Vt2 for obtaining a desired gradation voltage Vw1 may be applied. Here, the reason why the voltage Vt2 is higher than the voltage Vt1 is that the voltage control TFT 53 is the n-type transistor which is a condition for writing the positive-polarity voltage of +Vdd and the source-drain resistance is high.

In a subsequent field, a voltage Vt0 is written in the gate of the voltage control TFT 53 to place the voltage control TFT 53 in an OFF-state, so that the first electrode potential approaches the second electrode potential as the result of the resistive voltage division.

Even such a driving method can suppress the resistance layer resistance in the neighborhood of the partition wall, so that the same effects as in the driving method described with reference to FIG. 12. Further, by providing the voltage control TFT 53 as a means for controlling a current passing through the first electrode, a stable current is supplied to the first electrode even when the pixel TFT 46 is in the OFF-state. As a result, a potential drop can be prevented to effect good display.

Figure 14:
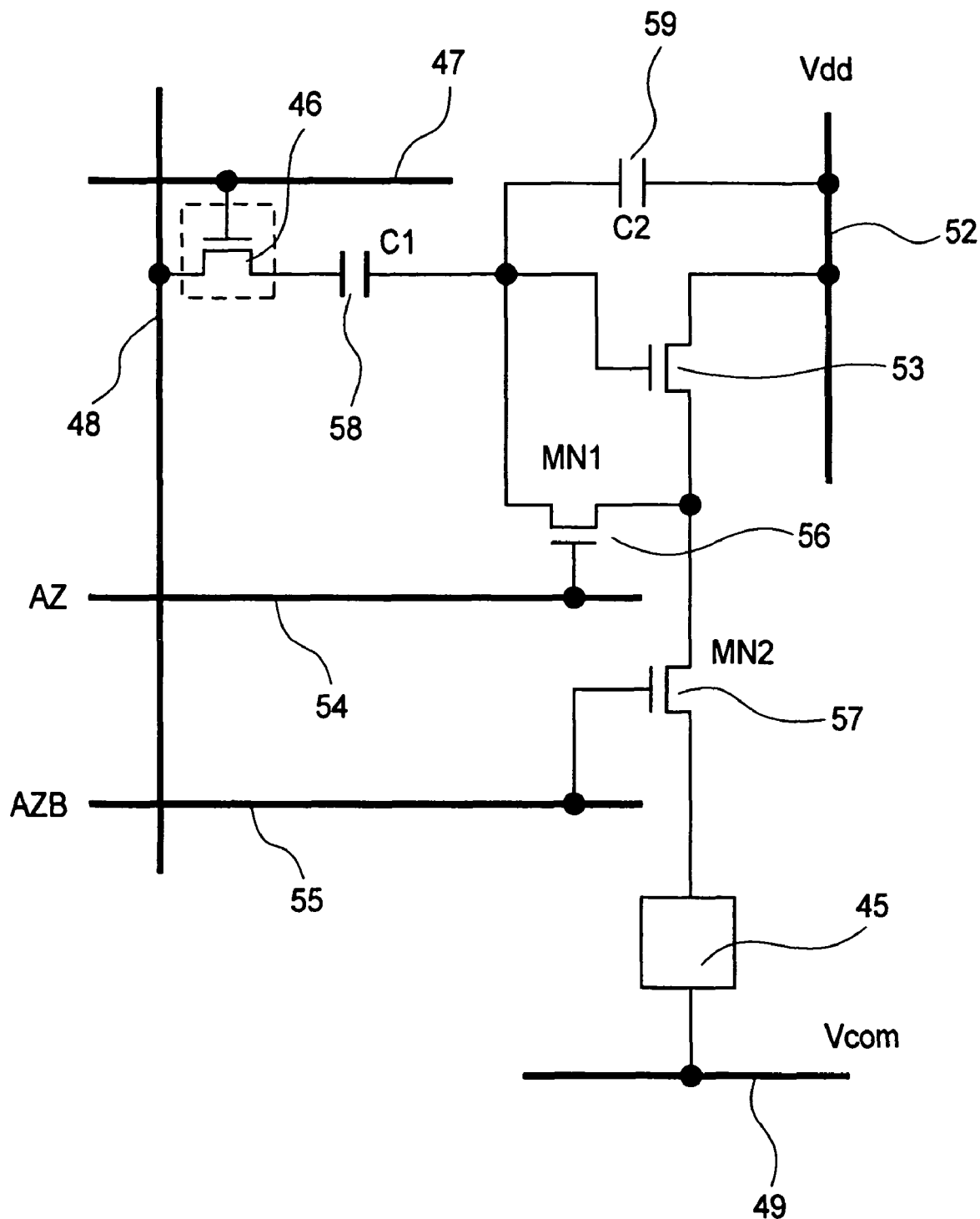
FIG. 14 is another equivalent circuit view at one pixel of an electrophoretic display panel of the electrophoretic display apparatus.

FIG. 14 is another equivalent circuit view at one pixel of the electrophoretic display panel 44, wherein in addition to the equivalent circuit shown in FIG. 12, an AZ line 54, an AZB line 55, n-type transistors 56 and 57 (MN1 and MN2) and capacitors 58 and 59 (C1 and C2) are added.

Hereinbelow, a specific method will be described.

Figure 15:
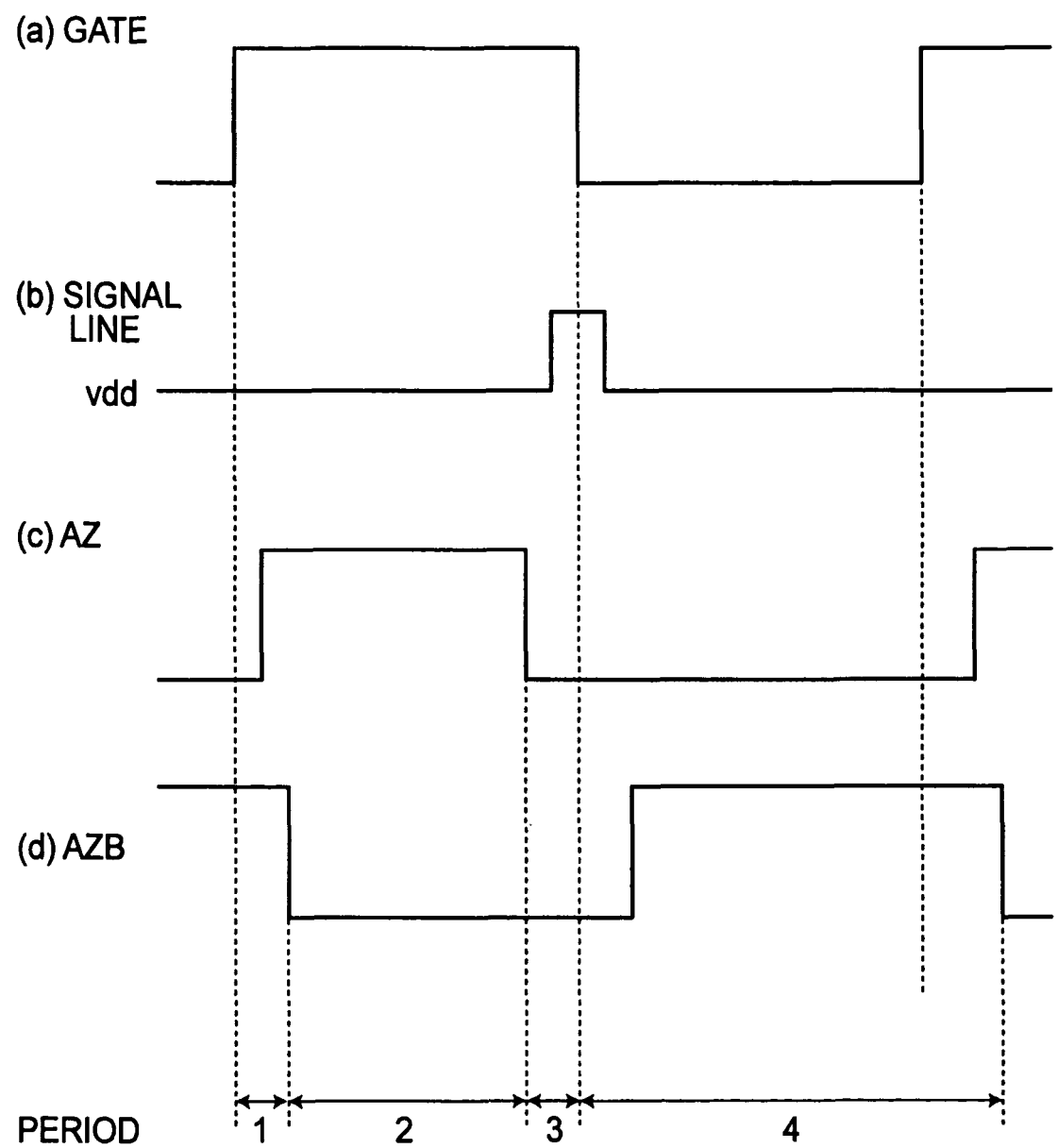
FIGS. 15(a) to 15(d) are drive waveform diagrams at one pixel of the electrophoretic display panel of the electrophoretic display apparatus.
Figure 16:
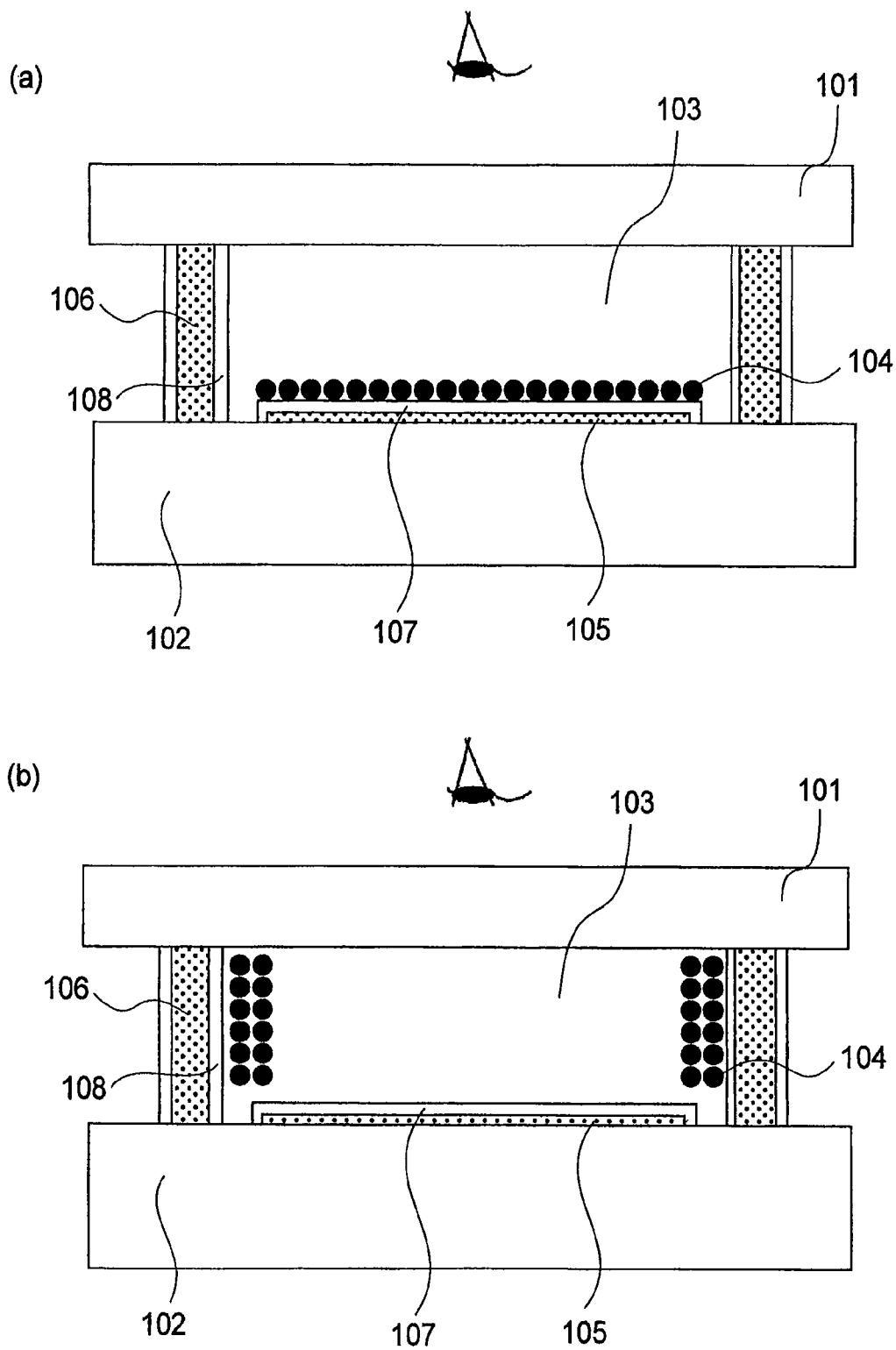
FIGS. 16(a) and 16(b) are sectional views showing one pixel of a conventional electrophoretic display device.
Figure 17:
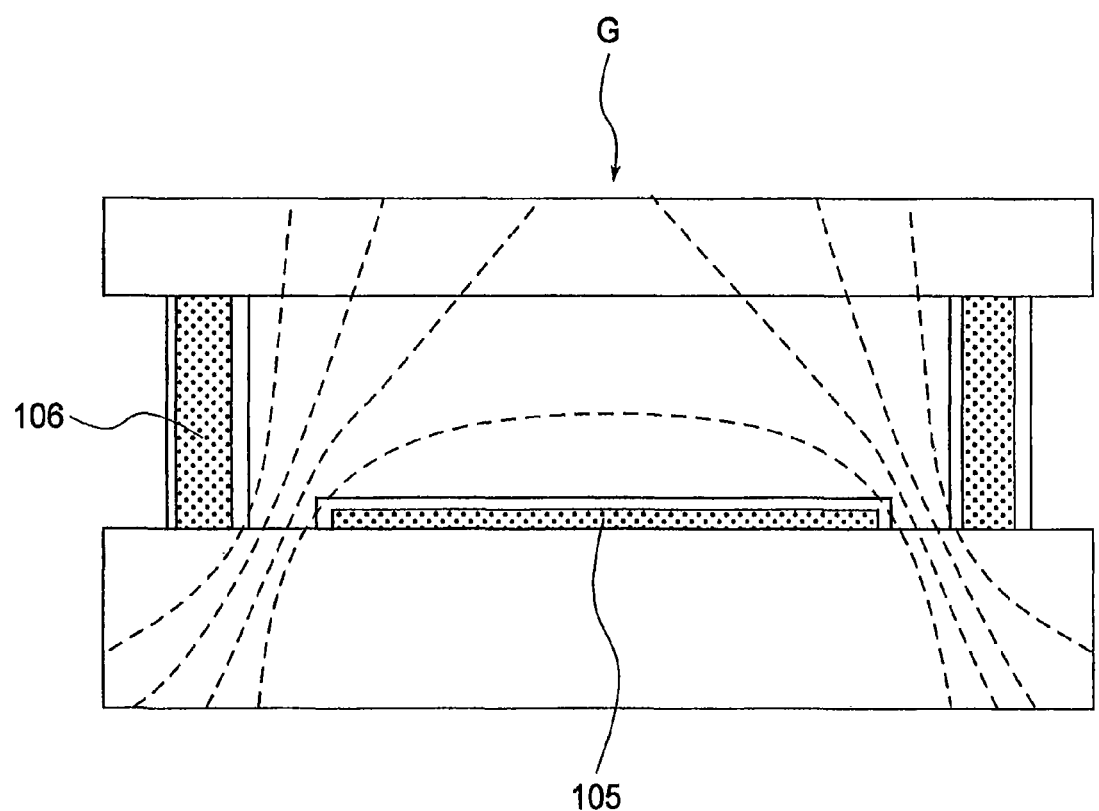
FIG. 17 is a sectional view showing an equipotential line in a drive state of the conventional electrophoretic display device.
Figure 18:
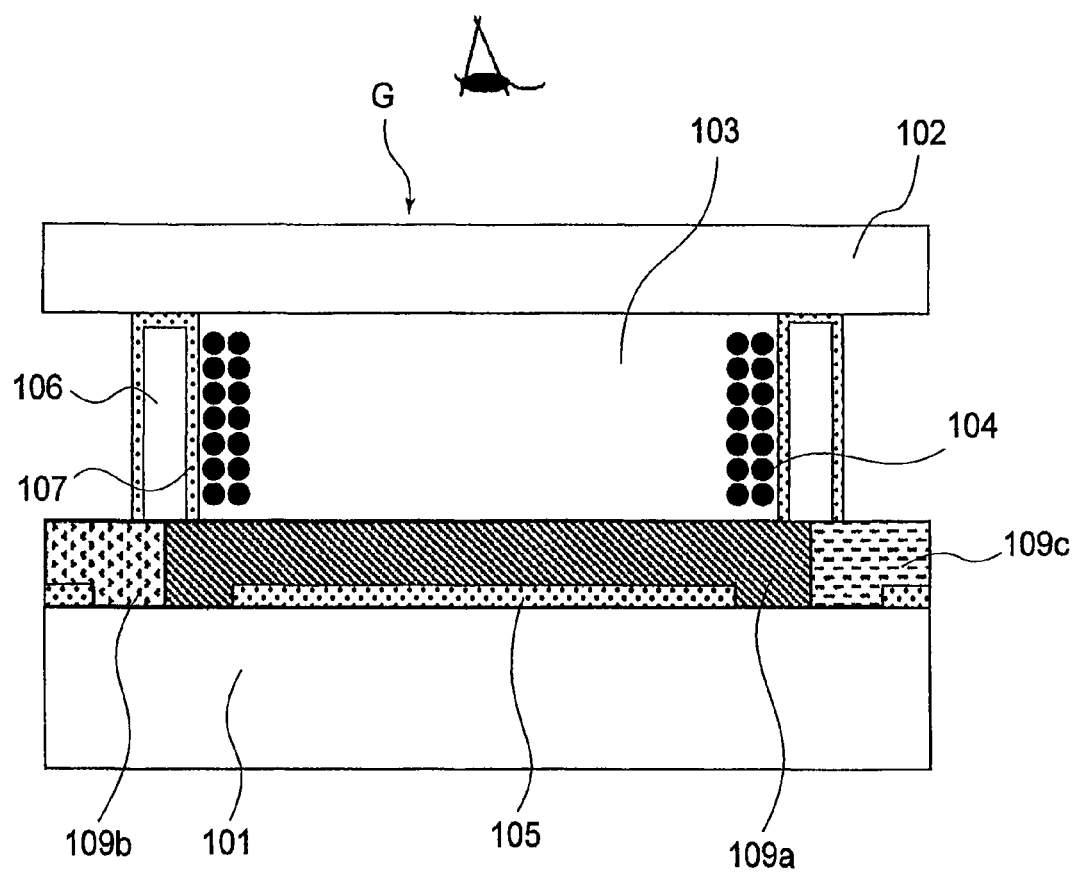
FIG. 18 is a sectional view showing one pixel of another conventional electrophoretic display device.

FIGS. 15(*a*) to 15(*b*) show drive waveforms at certain one pixel of the electrophoretic display panel 44. Here, the potential of the second electrode 7 is 0 V. FIG. 15(*a*) shows a gate signal (scanning signal pulse) inputted from the gate driver 42, FIG. 15(*b*) shows a signal line potential (data (information) signal pulse) inputted from the source driver to the pixel, FIG. 15(*c*) shows an AZ signal and a resistance layer potential waveform, and FIG. 15(*d*) shows an AZB signal.

In period 1, a level of the gate signal is raised, whereby the pixel TFT 46 is turned on. As a result, the drain electrode potential of the pixel TFT 46 is equal to the signal line potential Vdd. Thereafter, a level of the AZ signal is also raised to place MN1 in an ON-state. In a previous sequence, the AZB in the ON-state, so that the first electrode potential is substantially equal to the second electrode potential (0 V). Accordingly, gate-source voltage of the voltage control TFT 53 is negative, so that the OFF-state of the voltage control TFT 53 is ensured.

In period 2, a level of the AZ signal is raised, whereby MN1 is placed in an ON-state, and by the level of the AZB line, MN2 is placed in an OFF-state. As a result, a current for Vdd flows into the gate of the voltage control TFT 53, so that electric charges flow until a gate-source voltage Vgs is equal to a threshold voltage Vth of the voltage control TFT 53. At the time of Vgs=Vth, the TFT 53 is placed in the OFF state.

Thereafter, when the level of the AZ signal is lowered so as to place MN1 in the OFF-state, the threshold voltage Vth is recorded (stored) in C1 and C2. More specifically, a voltage difference of C1 is Vdd–Vth and a voltage difference of C2 is also Vdd–Vth.

In period 3, when a signal having a level higher than Vdd by ΔV data is inputted in the signal line, the gate voltage of the voltage control TFT 53 is fluctuated by capacitive voltage division.

In period 4, when the AZB signal is turned on, a current passes through the first electrode.

According to the above described constitution, it is possible to compensate an irregularity in the threshold voltage Vth, so that even when the characteristic of the TFT 53 varies pixel by pixel, a constant current can be passed through the first electrode. As a result, it is possible to prevent the fluctuation in first electrode potential caused by the irregularity in threshold of the voltage of the voltage control TFT 53, so that a desired gradation display can be effected. As a result, it is possible to effect uniform and good display with no irregularity in an in-plane picture area of the electrophoretic display panel.

INDUSTRIAL APPLICABILITY

According to the present invention, it is possible to provide an electrophoretic display device and apparatus which are capable of retaining the memory characteristic while improving a brightness.

While the invention has been described with reference to the structures disclosed herein, it is not confined to the details set forth and this application is intended to cover such modifications or changes as may come within the purpose of the improvements or the scope of the following claims.

The invention claimed is:

1. An electrophoretic display device, comprising:
a substrate;
a sealing plate;
a partition wall disposed between the substrate and the sealing plate;
a liquid layer, disposed in a container including the substrate and the partition wall, comprising electrophoretic particles and a dispersion medium;
a first electrode formed at a position apart from the partition wall on the substrate;
a second electrode formed along the partition wall; and
a resistance layer electrically connecting the first electrode and the second electrode to allow current flow between the first electrode and the second electrode,
wherein the resistance layer is an indium-tin-oxide film and is continuously arranged between a surface of a liquid layer side of the first electrode and a surface of a liquid layer side of the second electrode.

2. An electrophoretic display device according to claim 1, wherein the first electrode is formed of a metal film.

3. An electrophoretic display device according to claim 1, wherein the resistance layer is continuously arranged between a surface of a liquid layer side of the first electrode and a surface of a liquid layer side of the second electrode.

4. An electrophoretic display device according to claim 1, wherein the resistance layer is formed to cover the partition wall.

5. An electrophoretic display device according to claim 1, wherein the resistance layer has a resistance value smaller than a resistance value of the liquid layer.

6. An electrophoretic display device according to claim 1, further comprising an insulating layer disposed between the liquid layer and the first electrode and having a contact hole, wherein the first electrode and the second electrode are electrically connected through the contact hole.

7. An electrophoretic display device according to claim 6, further comprising a light reflection layer disposed between the first electrode and the substrate.

8. An electrophoretic display device according to claim 6, wherein the insulating layer is a coloring layer.

9. An electrophoretic display device according to claim 7, wherein the light reflection layer is formed of an uneven portion.

10. An electrophoretic display device according to claim 3, further comprising means for applying a voltage between the first electrode and the second electrode.

11. An electrophoretic display device, comprising:
a substrate;
a sealing plate;
a partition wall disposed between the substrate and the sealing plate;
a liquid layer, disposed in a container including the substrate and the partition wall, comprising electrophoretic particles and a dispersion medium;
a first electrode formed at a position apart from the partition wall on the substrate;
a second electrode formed along the partition wall; and
a resistance layer electrically connecting the first electrode and the second electrode,
wherein the resistance layer comprises an indium-tin-oxide film and is continuously arranged between a surface of a liquid layer side of the first electrode and a surface of a liquid layer side of the second electrode.

* * * * *